US008201680B1

(12) United States Patent
Folk et al.

(10) Patent No.: US 8,201,680 B1
(45) Date of Patent: Jun. 19, 2012

(54) SYSTEM AND METHOD OF DISTRIBUTING CURRENCY

(75) Inventors: Amy Baker Folk, Charlotte, NC (US); William Thomas Sanders, Denver, NC (US); Daniel Christopher Bohen, Charlotte, NC (US); Veralyn Dee Hensley, Folsom, CA (US); Shane Anthony Johnson, Charlotte, NC (US); Justin Kilgore, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 245 days.

(21) Appl. No.: 12/241,201

(22) Filed: Sep. 30, 2008

(51) Int. Cl.
*G07F 7/00* (2006.01)
*G07F 7/04* (2006.01)
*G07F 19/00* (2006.01)
*G06Q 40/00* (2012.01)

(52) U.S. Cl. ........................................ 194/206; 235/379

(58) Field of Classification Search .................. 194/206, 194/215, 350, 217; 235/1 D, 379, 380, 381; 209/534; 902/12, 13, 22, 37; 705/16, 28, 705/308

See application file for complete search history.

(56) References Cited

U.S. PATENT DOCUMENTS

| | | | | |
|---|---|---|---|---|
| 4,059,122 | A | 11/1977 | Kinoshita | |
| 4,522,275 | A | 6/1985 | Anderson | |
| 4,988,849 | A | 1/1991 | Sasaki et al. | |
| 5,756,977 | A | 5/1998 | Biss | |
| 5,947,257 | A | 9/1999 | Schwartz | |
| 6,540,090 | B1 * | 4/2003 | Sakai et al. | 209/534 |
| 6,934,688 | B2 * | 8/2005 | Carter | 235/382 |
| 6,941,274 | B1 | 9/2005 | Ramachandran et al. | |
| 6,983,836 | B2 * | 1/2006 | Adams et al. | 194/302 |
| 7,036,651 | B2 * | 5/2006 | Tam et al. | 194/217 |
| 7,112,130 | B2 * | 9/2006 | Nishimura et al. | 453/3 |
| 7,158,662 | B2 | 1/2007 | Chiles | |
| 7,163,454 | B2 | 1/2007 | Carter | |
| 7,232,024 | B2 | 6/2007 | Mazur et al. | |
| 7,347,358 | B2 | 3/2008 | Ireland et al. | |
| 7,350,699 | B2 | 4/2008 | Gunst et al. | |
| 7,407,091 | B2 | 8/2008 | Graef et al. | |
| 7,419,091 | B1 | 9/2008 | Scanlon | |
| 7,900,829 | B1 | 3/2011 | Folk et al. | |
| 2001/0013541 | A1 | 8/2001 | Modi | |
| 2001/0032118 | A1 | 10/2001 | Carter | |
| 2001/0034203 | A1 | 10/2001 | Geib et al. | |
| 2002/0152141 | A1 | 10/2002 | Carter | |

(Continued)

OTHER PUBLICATIONS

Office Action for corresponding U.S. Appl. No. 12/277,890 mailed Apr. 28, 2011.

*Primary Examiner* — Mark Beauchaine

(74) *Attorney, Agent, or Firm* — Banner & Witcoff, Ltd.; Michael A. Springs

(57) ABSTRACT

A cash recycler or other currency handling device includes a system and method for distributing currency to one or more cash drawers for use in a cash register or other point of sale device. A user may pre-configure an amount of currency to be distributed to one or more cash drawers or tills. The cash recycler may include one or more slots into which the one or more cash drawers or tills may be inserted. The preconfigured amount of currency will then be distributed to each of the tills inserted into the cash recycler. In some arrangements, multiple cash drawers may be inserted into the cash recycler and currency will be distributed to each of the cash drawers simultaneously.

20 Claims, 12 Drawing Sheets

U.S. PATENT DOCUMENTS

| | | | |
|---|---|---|---|
| 2004/0173432 | A1 | 9/2004 | Jones |
| 2004/0231955 | A1 | 11/2004 | Carter |
| 2005/0017066 | A1 | 1/2005 | Carter |
| 2005/0077142 | A1 | 4/2005 | Tam et al. |
| 2005/0183927 | A1 | 8/2005 | Aas et al. |
| 2005/0205654 | A1 | 9/2005 | Carter |
| 2005/0230471 | A1 | 10/2005 | Carter |
| 2006/0151283 | A1 | 7/2006 | Carter |
| 2007/0151827 | A1 | 7/2007 | Brandstrom et al. |
| 2007/0235523 | A1 | 10/2007 | Clements |
| 2010/0017017 | A1 | 1/2010 | Adams et al. |
| 2010/0127070 | A1 | 5/2010 | Sanders et al. |
| 2010/0131374 | A1 | 5/2010 | Sanders et al. |

* cited by examiner

SYSTEM AND METHOD OF DISTRIBUTING CURRENCY

BACKGROUND

Cash flow refers to the movement of cash over a particular time period within a business or enterprise. The calculation of cash flow may be used as one measure to gauge financial health of the business. Managers in charge of cash flow management may use various tools to assist in making decisions involving cash flow including cash recyclers which allow a retail establishment to maintain and re-use an amount of currency on-site. The cash recycler may further calculate and manage use of cash flows in real-time.

While cash recyclers allow a business to manage their cash flows in a more seamless manner, cash recyclers often require an individual to manually remove cash from the cash recycler and place it into a cash drawer or till for use in a cash register or other point of sale device. In addition, conventional systems often require that each withdrawal of currency for the cash drawer or till be requested individually and/or by keying in the number and denomination of the currency requested for each individual drawer. This process can be inefficient, time consuming and may pose a security threat because of individuals handling currency. In addition, it is possible that multiple tills or cash drawers would not have the same amount of currency at the start of a shift or day due to error in distributing the currency to the cash drawer or till. Accordingly, providing an automated, reliable, duplicative means of distributing currency to one or more cash drawers or tills would be advantageous.

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

Aspects of this disclosure relate to a cash recycler or other cash handling device for use with a system of distributing currency. A user may pre-configure an amount of currency to be distributed to one or more cash drawers or tills. The cash recycler may include one or more slots into which the one or more cash drawers or tills may be inserted. The preconfigured amount of currency will then be distributed to each of the tills inserted into the cash recycler. In some arrangements, multiple cash drawers may be inserted into the cash recycler and currency will automatically be distributed to each of the cash drawers simultaneously or sequentially.

BRIEF DESCRIPTION OF THE DRAWINGS

The present disclosure is illustrated by way of example and not limited in the accompanying figures in which like reference numerals indicate similar elements.

The reader is advised that the attached drawings are not necessarily drawn to scale.

Figure 12:
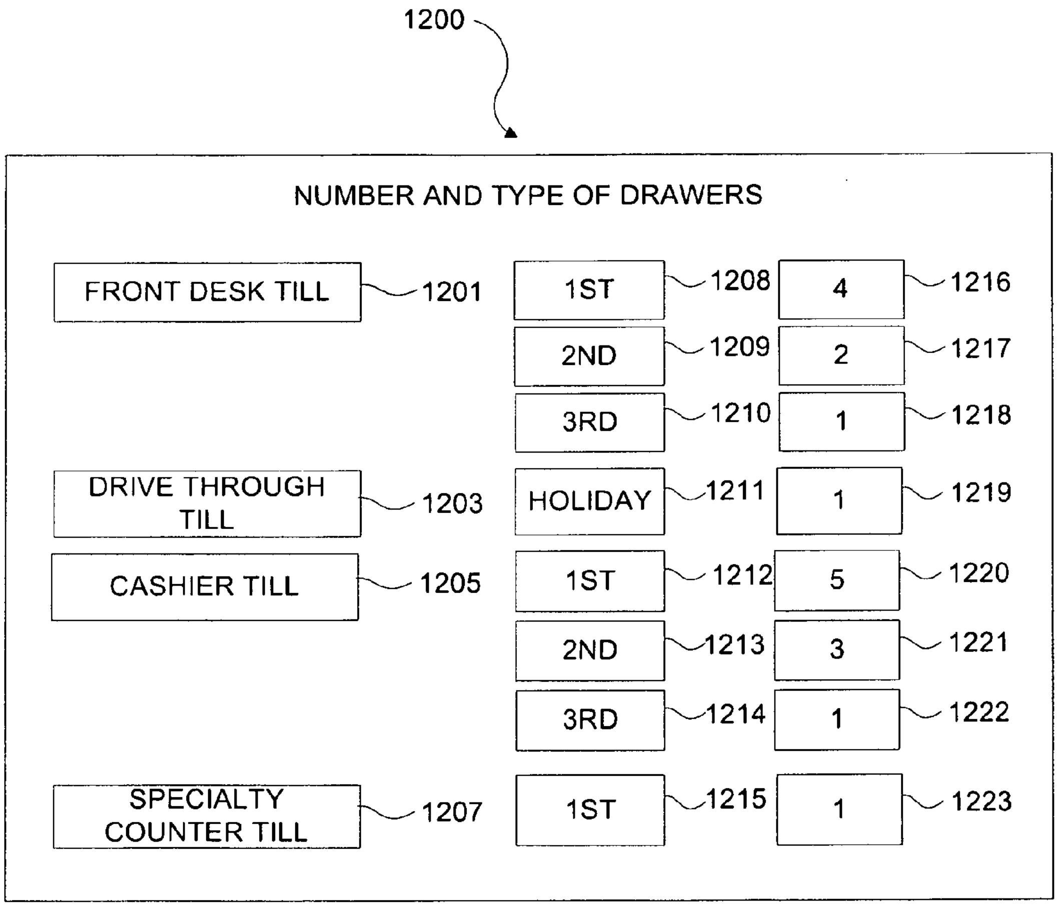

FIG. 12 illustrates an example user interface for configuring aspects of the currency distribution system according to aspects described herein.

DETAILED DESCRIPTION

Aspects of the present disclosure relate to cash handling devices. Cash handling devices generally refer to devices that are configured to accept and/or dispense currency. Cash handling devices include payment kiosks, point of sale systems such as cash registers, automated teller machines (ATMs), currency recyclers and the like. Currency recyclers generally refer to cash handling devices that are configured to dispense the same currency that was earlier deposited. For example, if a user deposits a 5 dollar bill into a cash recycler machine, the same 5 dollar bill may be dispensed during a subsequent withdrawal transaction. Thus, using currency recyclers, deposited currency may be placed immediately back into use and circulation instead of being held or frozen until a bank is able to collect and reconcile the funds, stored indefinitely and/or taken out of circulation entirely as is the case with other current cash handling devices.

Figure 1:
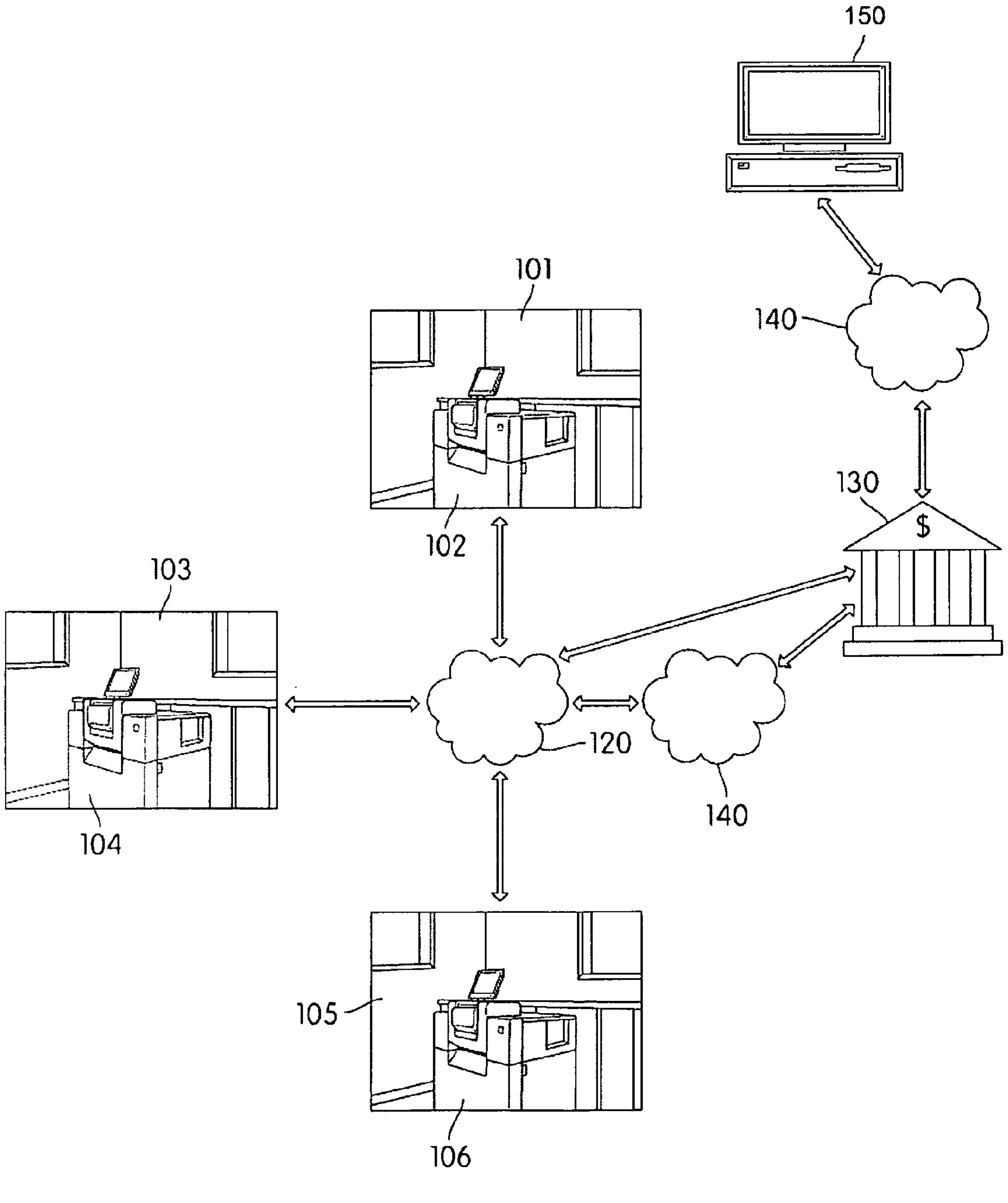
FIG. 1 illustrates an example of a suitable operating environment in which various aspects of the disclosure may be used.

FIG. 1 illustrates an example of a suitable operating environment in which various aspects of the disclosure may be implemented. Devices 102, 104, 106 may include currency recyclers and/or other cash handling devices and may be located at various sites such as locations 101, 103, and 105. The locations may represent different stores of a business enterprise. For example, locations 101, 103, and 105 may represent three different grocery stores located in different geographical areas belonging to a grocery store chain. Those skilled in the art will realize that additional cash handling devices may be located in the same store or in other stores belonging to the grocery store chain. In addition, those skilled in the art will realize that a grocery store chain is only one illustrative example of the types of locations or businesses that cash handling devices such as recyclers may be located. For example, cash recyclers may also be located in gas stations, post offices, department stores, and other places where cash and other financial instruments are deposited or withdrawn.

FIG. 1 further illustrates that cash handling devices 102, 104, and 106 may be connected to a communications network such as communications network 120. Communications network 120 may represent: 1) a local area network (LAN); 2) a simple point-to-point network (such as direct modem-to-modem connection); and/or 3) a wide area network (WAN), including the Internet and other commercial based network services.

Cash handling devices 102, 104, and 106 may communicate with one another or with a financial institution such as bank 130 via communication network 120 in various manners. For example, communications between cash handling devices 102, 104, 106 and bank 130 may use protocols and networks such as TCP/IP, Ethernet, FTP, HTTP, BLUETOOTH, Wi-Fi, ultra wide band (UWB), low power radio frequency (LPRF), radio frequency identification (RFID), infrared communication, IrDA, third-generation (3G) cellular data communications, Global System for Mobile communications (GSM), or other wireless communication networks or the like. Communications network 120 may be directly connected to a financial institution such as bank 130. In another embodiment, communications network 120 may be connected to a second network or series of networks 140 such as the STAR network before being connected to bank 130. According to one or more arrangements, bank 130 may utilize an infrastructure which includes a server 150 having components such as a memory, a processor, a display, and a communication interface.

Figure 2:
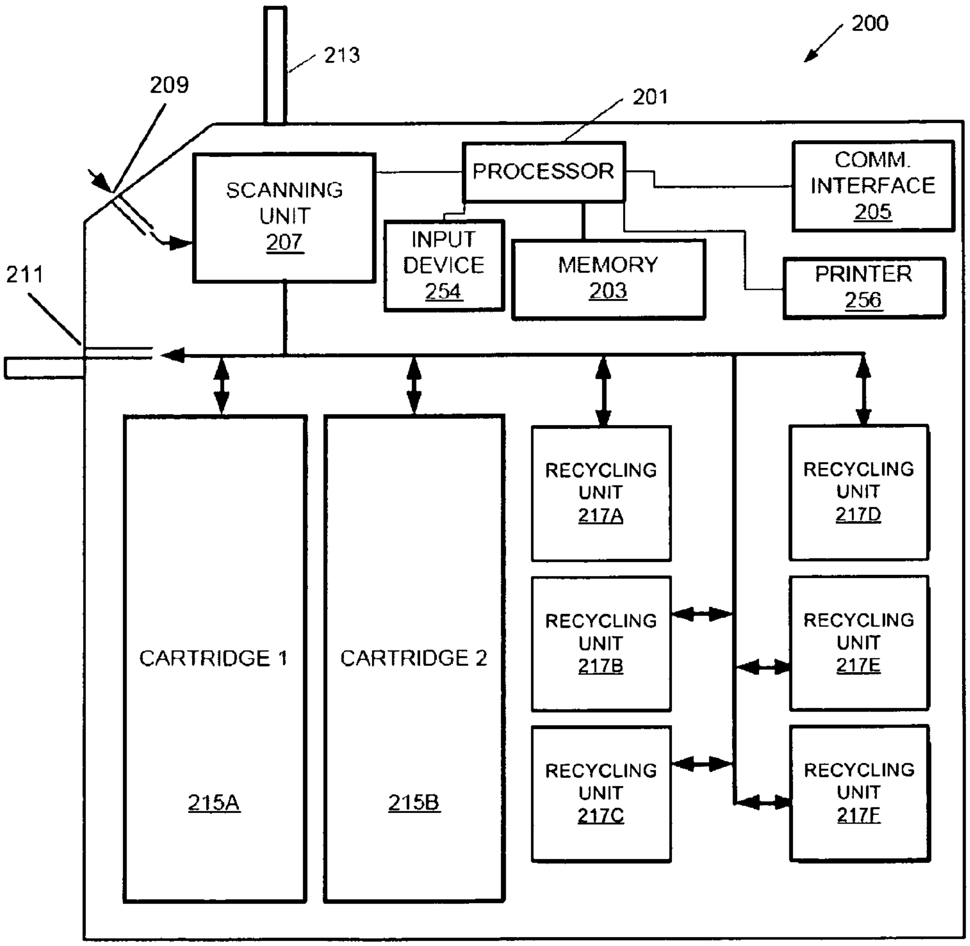
FIG. 2 illustrates a simplified diagram of a currency recycler in accordance with an aspect of the invention.

FIG. 2 illustrates a simplified diagram of a cash recycler that may be used in accordance with the operating environment of FIG. 1. Cash recycler 200 may include processor 201, memory 203, communication interface 205, scanning unit 207, display 213 and various cartridges 215 and recycling units, such as stackers and/or rolled storage modules (RSMs) 217. Processor 201 may be generally configured to execute computer-readable instructions stored in memory 203 such that, for example, cash recycler 200 may send and receive information to and from a bank (e.g., bank 130 of FIG. 1) using communication interface 205 and via a network (e.g., networks 120 and/or 140 of FIG. 1). Memory 203 may be configured to store a variety of information including the aforementioned computer-readable instructions, funds balance data, reconciliation data, user account information and the like. Additionally, memory 203 may include non-volatile and/or volatile memory. One or more databases may be stored in the memories 108, 112, and 116.

Cash recycler 200 may further provide display 213 to present data and/or messages to a user. For example, display 213 may be configured to display a recycler balance, a transaction interface, a current deposit count, security options, transportation options and the like. One or more input devices 254 such as a keypad, keyboard, mouse, touchscreen, fingerprint scanner, retinal scanner, proximity card reader, RFID scanner and/or writer, magnetic card reader, barcode reader, and/or combinations thereof, or any other type of input device or reader capable of inputting, reading, or scanning indicia or information, may also be included in or connected to recycler 200. One or printers 256 may also be included in or connected to recycler 200 for printing receipts and notifications as well.

In cash recycler 200, recycling units 217 and cartridges 215 are configured to store currency. Currency may be inserted through input slot 209 and withdrawn through withdrawal slot 211. Recycling units 217 may be used to store and organize currency based on denomination. For example, all $5 bills may be stored in recycling unit 2 (i.e., recycling unit 217B) while all $20 bills may be stored in recycling unit 3 (i.e., recycling unit 217C). Cartridges 215A and 215B, on the other hand, may be used to store overflow currency and/or currency for transport. Thus, if recycling units 217 become full, additional currency that is deposited into recycler 200 may be stored in an overflow cartridge such as cartridge 215B. One of cartridges 215 may be designated as a transport cartridge that stores currency to be withdrawn from the machine and transported to the bank. Alternatively or additionally, one or more of cartridges 215 may be used as an unfit bill store for currency determined to be defective to a degree that it should be taken out of circulation. Cartridges 215 and recycling units 217 may further be removable for easier access or transport.

Scanning unit 207 may be configured to scan each bill or currency that is inserted into recycler 200. Scanning unit 207 may be configured to detect defects, counterfeits, denomination, type of currency (e.g., which country the currency originates from) and the like. Scanning unit 207 may further be configured to refuse money (either through input slot 209 or withdrawal slot 211) if it cannot be properly recognized or if the currency is deemed to be counterfeit. Scanning unit 207 may send such data to processor 201 which may, in turn, save the data in memory 203.

Further, recycler 200 may include one or more mechanical or electromechanical systems (not shown) for automatically transferring currency between recycling units 217, cartridges 215, input slot 209 and withdrawal slot 211 in recycler 200. For example, currency may automatically be withdrawn from recycling units 217 and directed into cartridge 215A for storage using a series of motorized rollers. In another example, currency stored in cartridge 215A may be withdrawn and organized and stored into recycling units 217 according to denomination. Using such systems to facilitate the automated movement of currency between storage components and other portions of recycler 200 may provide efficiency and security by alleviating some of the need to manually handle currency stored within recycler 200.

Figure 3:
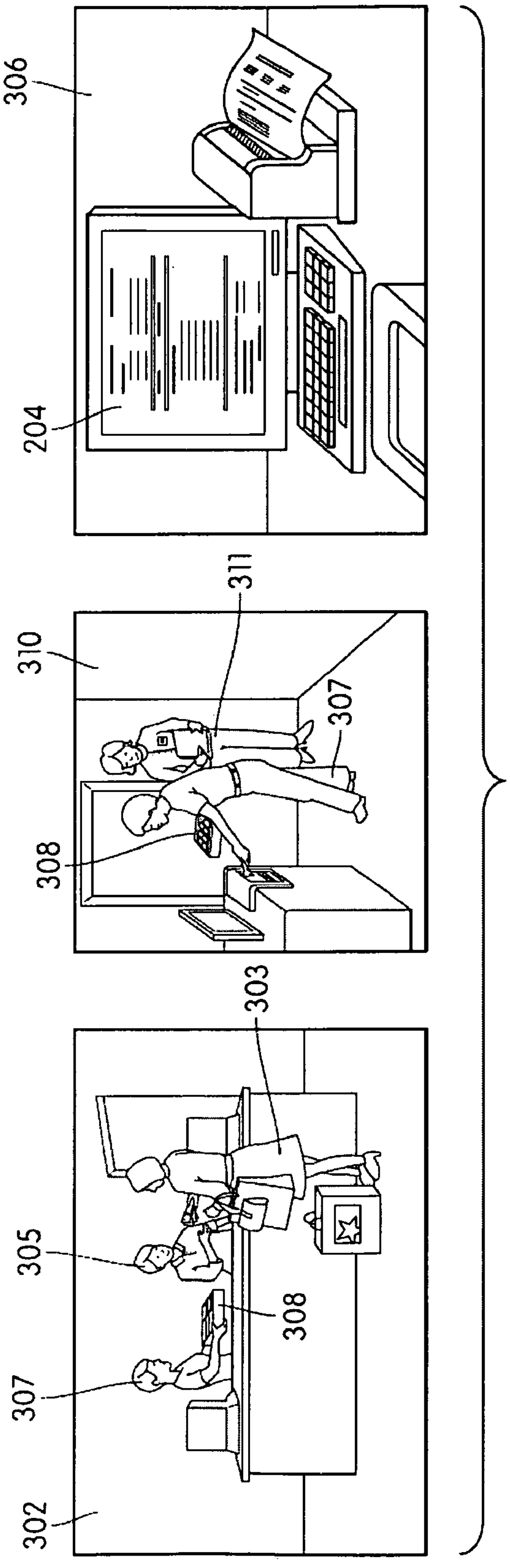
FIG. 3 illustrates various features of a currency recycler that may be used in accordance with aspects of the invention.

FIG. 3 illustrates various features of cash recycler, such as cash recycler 200 of FIG. 2, used in various aspects of the invention. The images in FIG. 3 depict use of a single cash recycler 200 in a retail environment. The retail owner may have a cash recycler 200 located in each of their stores. In an aspect of the invention, summary information for the retail owner's stores may be available via an interface to the financial institution. In another embodiment, access to summary information may be available directly from each of the cash recyclers 200.

In FIG. 3, image 302 depicts customer 303 paying cash to a retail employee such as store cashier 305 for a purchase. Another store cashier 307 at a recently closed cash register may be carrying a cash drawer or till 308 to a back office for reconciliation. In image 310, store cashier 307 may load currency from cash register till 308 into cash recycler 200. In addition, store cashier 307 may also deposit other paper forms of payment received from customer such as checks. An office manager 311 may be supervising cashier 307 during the loading of cash register till 308 into cash recycler 200. Moreover, upon the start of a shift a cashier may fill his/her cash register till with a designated amount of currency dispensed from cash recycler 200.

In image 306 of FIG. 3, a display screen (e.g., display 213 of cash recycler 200 of FIG. 2) may show the total amount entered into cash recycler 200 from till 308. The display screen 213 may breakout the amount entered into cash recycler 200 by denomination and by each cashier. The total amount deposited and withdrawn from cash recycler 200 may be shown on display screen 213.

Figure 4:
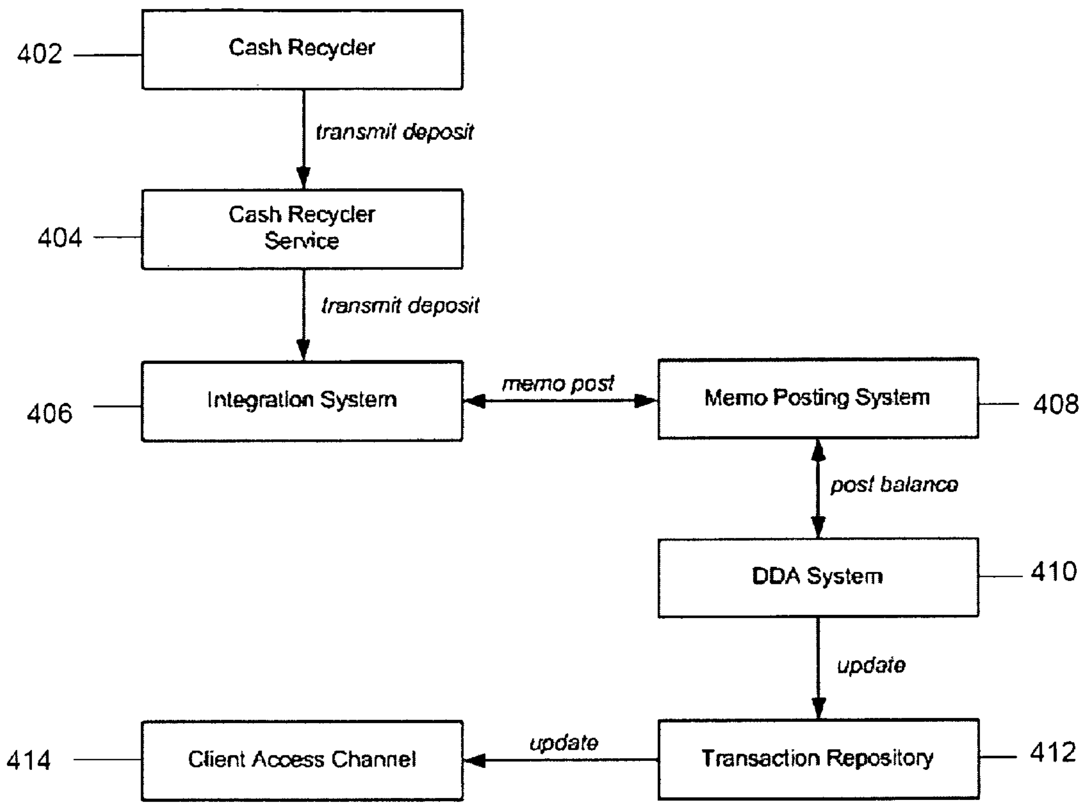
FIG. 4 illustrates additional features of a currency recycler used in various aspects of the invention.

FIG. 4 illustrates a system configuration that may be used in accordance with an aspect of the invention. In FIG. 4 a cash recycler 402 may communicate information to cash recycler service 404 located at a remote location. For example, cash recycler 402 may communicate deposit and withdrawal information from an enterprise location (e.g., a retail store) to the remote cash recycler service 404. The information may be routed through various networks such as the Internet to reach the cash recycler service. The cash recycler service 404 may be located in the data center of a financial institution. The cash recycler service 404 may communicate with an integration system 406 which provides access to the financial systems and processes. The integration system 406 may communicate with a memo posting system 408 which may perform posting activity. The posting system 408 may update the appropriate DDA (direct deposit account) system 410 to reflect the balance changes in the enterprises account balances. The DDA system 410 may also update a transaction repository 412 for historical and intra-day reporting purposes. An enterprise employee may access information stored in the transaction repository 412 through a client access channel 414 via web browser. Those skilled in the art will realize that the financial institution may allow the enterprise user to access the information stored in the transaction repository via numerous alternative communication methods.

According to one aspect, cash recyclers such as cash recycler 102 (FIG. 1) and 200

(FIG. 2) and other cash handling devices may facilitate real-time recognition of funds. In particular, funds deposited at a recycler or other cash handling device at a client site may be recognized by a bank at the time the deposit is made. Recognition refers to the real credit (i.e., not provisional) of deposited funds into a client's account. In contrast to current systems, there is no delay between a deposit of funds and when the funds and transaction data are submitted to the bank for recognition. Thus, instead of having to wait until the end of the day or another prescheduled time for deposits and/or withdrawals to be recognized by the bank, each deposit is processed for recognition in real-time. Data regarding the withdrawal or deposit transaction may be transmitted through a data network to the bank for recognition and processing. Providing real-time recognition offers may advantages including the ability for a client to withdraw the same currency that was earlier deposited for use in the client's operations, all at the client site and without having to first transport the deposited funds to the bank for recognition. Currency recyclers, recycling management and recognition of funds are further described in U.S. application Ser. No. 11/614,656, entitled "Commercial Currency Handling and Servicing Management," filed on Dec. 21, 2006, the content of which is incorporated herein by reference in its entirety.

In some arrangements, cash recyclers may be used to distribute currency to one or more cash drawers or tills, such as a till for a cash register or other point of sale system. The system and method described herein permits a user to preconfigure the amount of currency to be distributed to each till. Further, the preconfigured amount of currency may include the number of bills of each denomination to distribute to each till. In some arrangements, the amount of preconfigured currency is identical for each till to ensure that each point of sale system has the same amount of currency in the till. This aids in balancing funds at the end of a shift, end of a day, etc. In addition, the cash recycler described herein may include one or more slots into which a till may be inserted. Upon insertion of a till, the cash recycler may automatically distribute the preconfigured amount of currency to each till.

Figure 5:
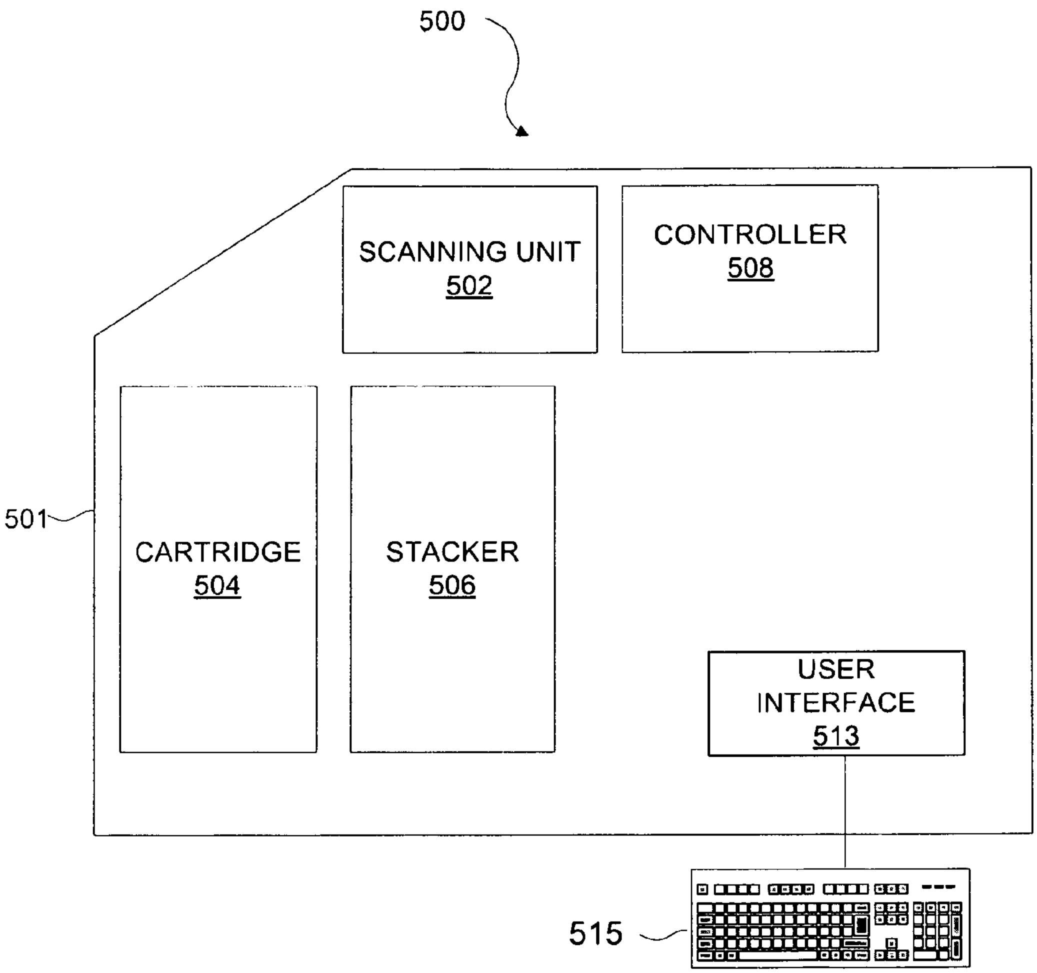
FIG. 5 is a schematic diagram of a currency recycler including various components used in accordance with one or more aspects of the invention.

FIG. 5 illustrates an example cash recycler 500. The cash recycler 500 or other currency handling device described above may include various components. For instance, the cash recycler 500 may include some or all aspects of the cash recycler 200, as shown in FIG. 2. The cash recycler 500 of FIG. 5 includes a controller 508 configured to process transactions including transmitting data to a financial institution for recognition at the financial institution, control mechanical systems of the cash recycler 500, control access to one or more portions of recycler 500, reconcile logical and physical counts of funds and the like. The controller 508 may be an external component or may be integrated into the cash recycler 500. The controller 508 generally includes a processor and memory such as RAM and ROM (not shown). In addition, the controller 508 may include or have access to storage and include user interface 513. The user interface 513 may include a display as well as various input devices such as a keyboard 515, mouse, etc. In some arrangements, the display may be a touch-sensitive display thereby allowing user input to be received through the display. Additionally or alternatively, the user interface 513 may be configured to receive voice commands. The controller 508 may further be configured to control various peripheral devices, such as a printer, external storage device, speakers and the like using one or more adapters and interfaces (not shown).

The controller 508 is further configured to execute software for providing functionality to the cash recycler 500. For instance, the controller 508 may execute commands as directed by the software instructions to control transactions made using the currency recycler 500, communicate with the financial institution or other entity, provide outputs via the user interface 513 or a peripheral device, such as a printer, and also to physically move the currency within the cash recycler 500.

In one example, a user may deposit $1000 into the cash recycler 500. The user provides input through the user interface 513 regarding the deposit. This user input may include selection from a display, voice commands, and the like. The money is then deposited into the cash recycler 500. In one arrangement, the controller 508, in response to various instructions provided by software, may control the mechanical systems of the cash recycler 500, as well as the electronic (e.g., a communications interface) systems of the cash recycler 500. For instance, the controller 508 may operate the mechanical system that controls the flow of currency into the machine during a deposit. In another arrangement, the controller 508 may house the software configured to send and receive transaction data between recycler 500 and a remote device through a communication interface. In addition, the controller 508 controls the scanning device 502 to scan each bill inserted into the cash recycler 500 to confirm authenticity and to verify the condition of the bill. If a bill is deemed to be counterfeit, it may be removed from circulation and stored in a separate region of the cash recycler 500. In particular, the controller 508 may engage various mechanical systems such as automated rollers to store the bill in the separate region. If the bill is deemed too worn to be returned to circulation, the mechanical systems operated by the controller 508 may remove the bill and place it in a separate region for storage. If the bill is deemed suitable to return to circulation it may remain or be placed with the bills in the recycler 500 that are eligible for recirculation from recycler 500. Further, controller 508 may reconcile a deposit amount specified by a depositing user and a physical count of the currency actually deposited to insure accuracy and integrity. In addition, the controller 508 may store data related to the amount of currency inserted into the cash recycler 500, as well as the amount of currency removed from circulation for various reasons. In still other examples, the controller 508 may aid in transmitting the cash transaction information to the financial institution. Additionally or alternatively, the controller 508 may forward a communication, such as an email, to an email box reporting the cash transaction. In still other arrangements, the controller 508 may forward a report of the cash transaction to a peripheral device, such as a printer, to print the report as a record of the cash transaction.

Additionally or alternatively, access to the various functions of the cash recycler 500 may be password protected or may require other authorization, such as use of a radio-frequency identification (RFID) badge and authentication before a user may perform or adjust those functions. In one arrangement, biometric data, such as fingerprint, iris scan, and the like, may be used to authenticate a user of the cash recycler 500 to permit adjustment to various settings. In addition, access to the internal portion of the cash recycler 500 may be restricted to only authorized users. The cash recycler 500 may include one or more locks to prevent unauthorized access to the internal portion of the cash recycler 500. Integrating the controller 508 within the cash recycler 500 provides such additional security to prevent unauthorized access to the computer systems and internal portion of the cash recycler 500 and reduces the ability of would-be intruders to hack into the controller 508 and bypass such security measures.

Figure 6:
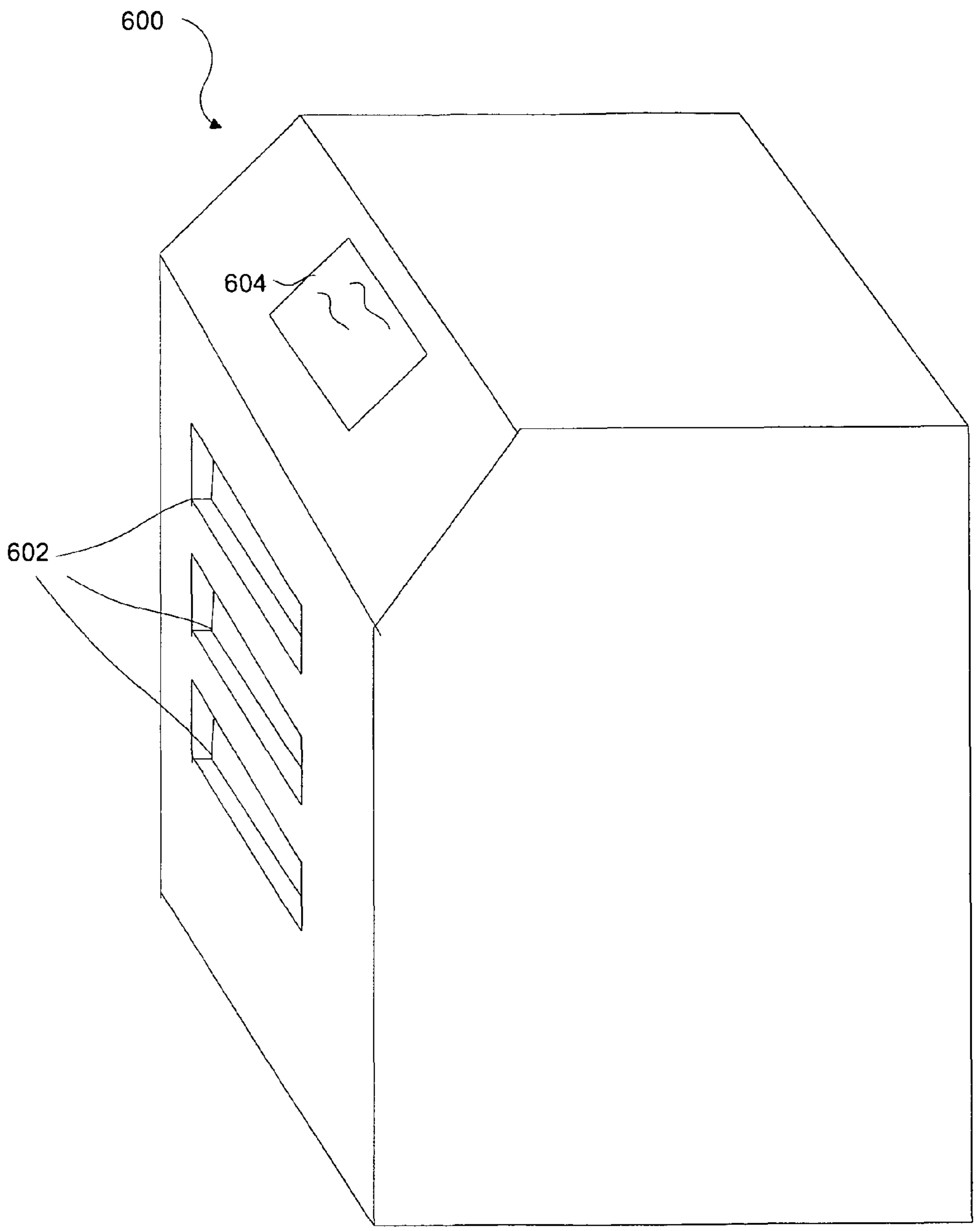
FIG. 6 is a perspective view of an example currency recycler having a plurality of cash drawer slots in accordance with aspects described herein.

FIG. 6 illustrates one example cash recycler 600 according to aspects described herein. The cash recycler 600 includes many or all of the features of the cash recycler shown in FIG. 2. In addition, the cash recycler 600 includes one or more apertures or slots 602 into which a till or cash drawer may be inserted. For instance, a user may pre-configure an amount of money to be distributed to each till, for example, using the user interface 604 of the cash recycler. A user may then insert a till into one of the slots 602 of the cash recycler 600. Upon insertion of the drawer, the cash recycler 600 will distribute the preconfigured amount of currency to the drawer. The drawer may then be removed and taken to the cash register or other point of sale unit. An acknowledgement or other indication that the currency has been distributed to the drawer may then be sent. In some arrangements, the acknowledgement may be sent via email or may be sent to a peripheral device, such as a printer.

Figure 7:
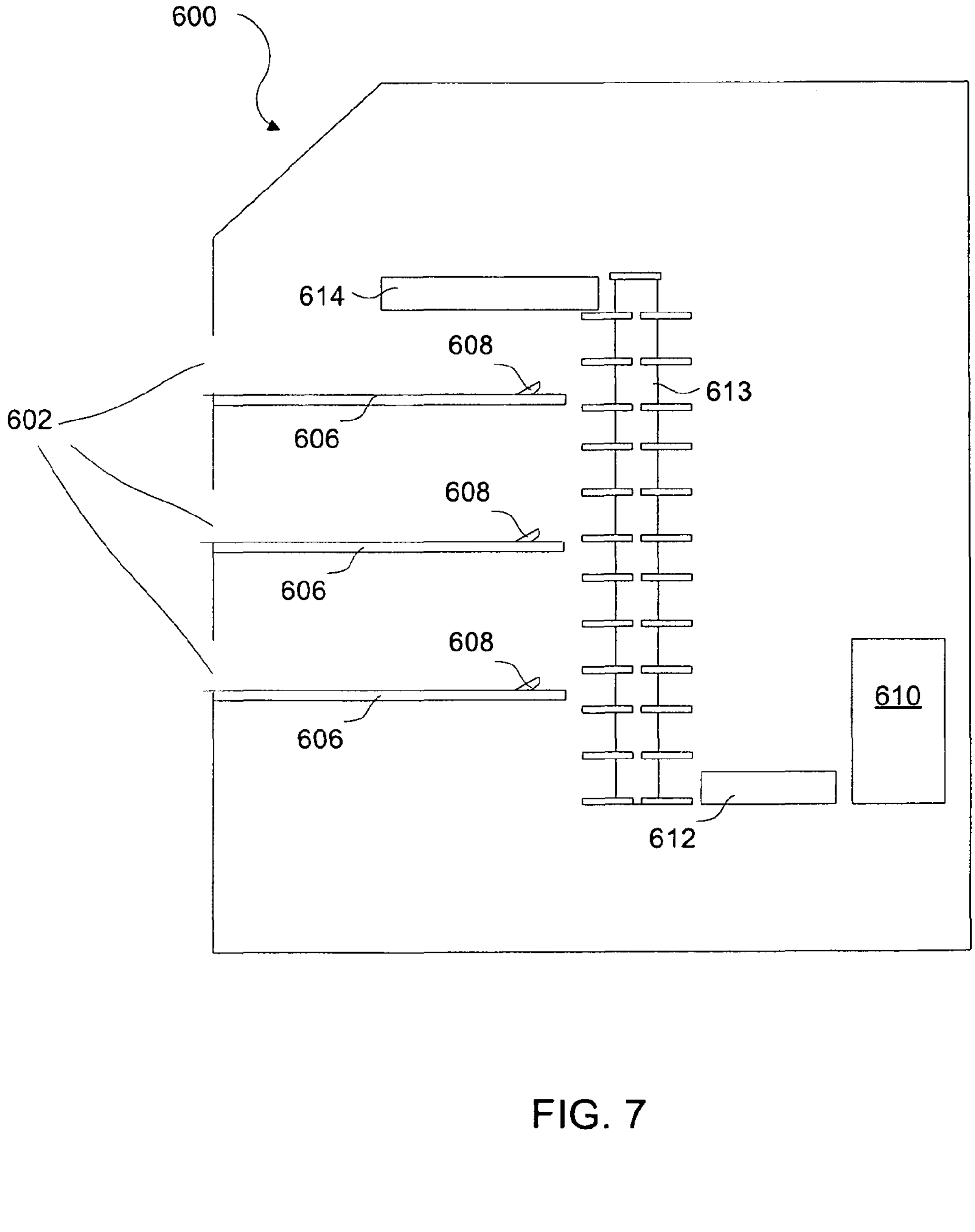
FIG. 7 is a side view of the cash recycler of FIG. 6.

FIG. 7 is a schematic side view of the cash recycler 600 of FIG. 6. As shown in FIG. 7, the cash recycler 600 includes three apertures 602 or slots into which a till or cash drawer may be inserted. In some arrangements, only a single slot 602 may be provided. In other arrangements, two or more slots 602 may be provided. In arrangements having a single slot 602, the cash recycler 600 can distribute cash to the single drawer upon insertion of the drawer into the slot 602. If multiple tills or drawers are used with a cash recycler 600 having a single slot 602, the user may insert the tills consecutively, i.e. one after another. The cash recycler 600 will distribute the currency to the drawer inserted and, when complete, the drawer may be removed and a second, third, fourth, etc. till may be inserted.

In arrangements such as the cash recycler 600 of FIG. 7, multiple slots 602 are provided. Accordingly, multiple tills may be inserted simultaneously. Once each drawer is inserted, the cash recycler 600 will distribute the predetermined amount of cash to each till. When complete, the tills may be removed and taken to the cash register or other point of sale system where they will be in use.

In addition, each slot 602 of the cash recycler 600 shown in FIG. 7 has a track or runner 606 to support the till when it is inserted in the cash recycler. In some arrangements, the track or runner 606 may include a sensor 608 to indicate that the drawer is fully inserted and the cash recycler 600 may dispense the currency. The sensor 608 may be any known type of sensor including mechanical, optical, weight sensor, and the like.

In distributing the currency to the till, the currency may be transferred from a storage area, such as storage area 610. The currency may be transferred to the drawers via known methods of moving cash through a cash recycler 600. For instance, the method of transfer may include one or more conveyors 612, 613, 614 a series of rollers, and the like. For example, the arrangement of FIG. 7 may use a plurality of conveyors 612-614 to transfer currency from the storage area 610 to the at least one till.

Figure 8:
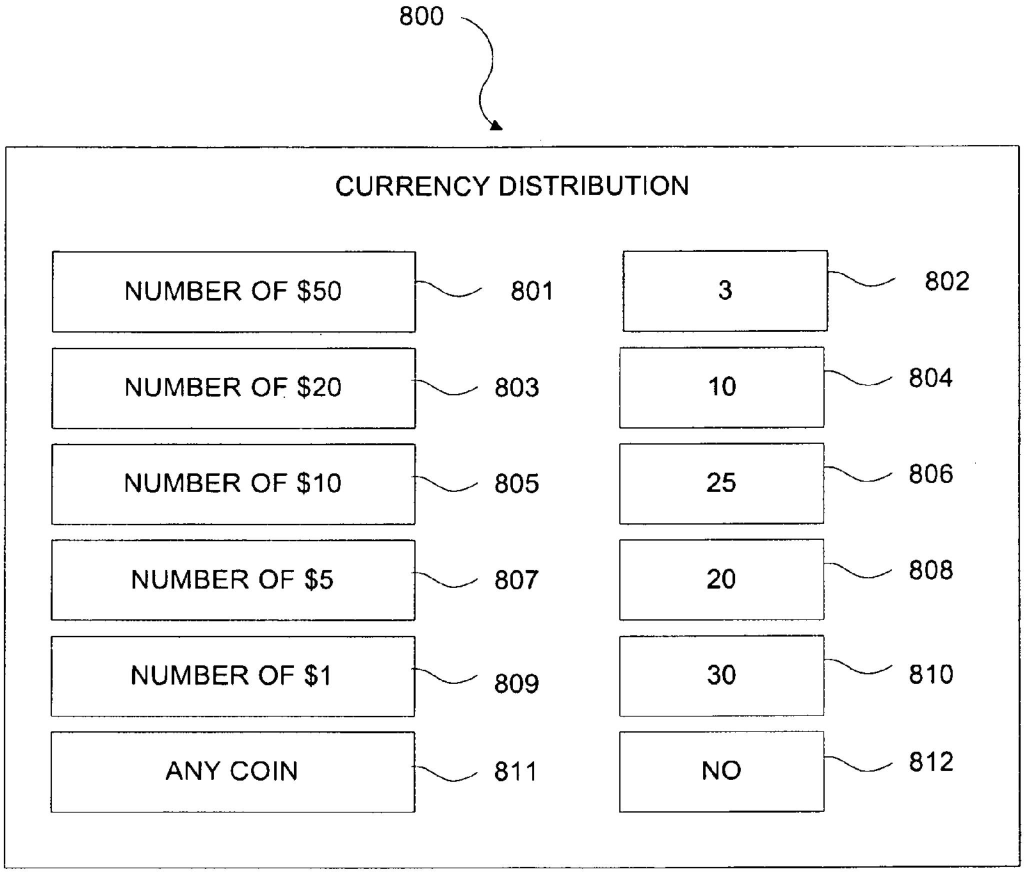
FIG. 8 illustrates one example user interface for preconfiguring the amount of currency to be distributed to a cash drawer according to aspects described herein.

The cash recycler 600 may include a plurality of user interfaces to configure the amount of currency to distribute to each till. For instance, FIG. 8 illustrates one example user interface 800 to configure the amount of currency distributed to a till. In the example of FIG. 8, each of fields 801, 803, 805, 807, 809 indicates a denomination of bills to be distributed to the till inserted into the cash recycler. For instance, field 801 indicates the number of

20 bills to distribute, etc. A user may configure the number of bills of each denomination in each of fields 802, 804, 806, 808, and 810. In order to make a selection of a number of bills, a user may select the field 802, 804, 806, 808, 810 using known means of selection, such as clicking in the field, double clicking in the field, and the like. Once the field is selected, the user may indicate the number by typing the number in the field, selecting a number of bills from a drop down list, selecting a radio button associated with a selection, and the like.

In some arrangements, the cash recycler may distribute rolled or loose coins to a cash drawer or till. User interface 800 permits a user to select whether coins will be distributed as well as bills in field 812. If the arrangement includes use of coins, the number of rolls of coins or of coins of each denomination may be configured in a separate user interface similar to user interface 800.

Figure 9:
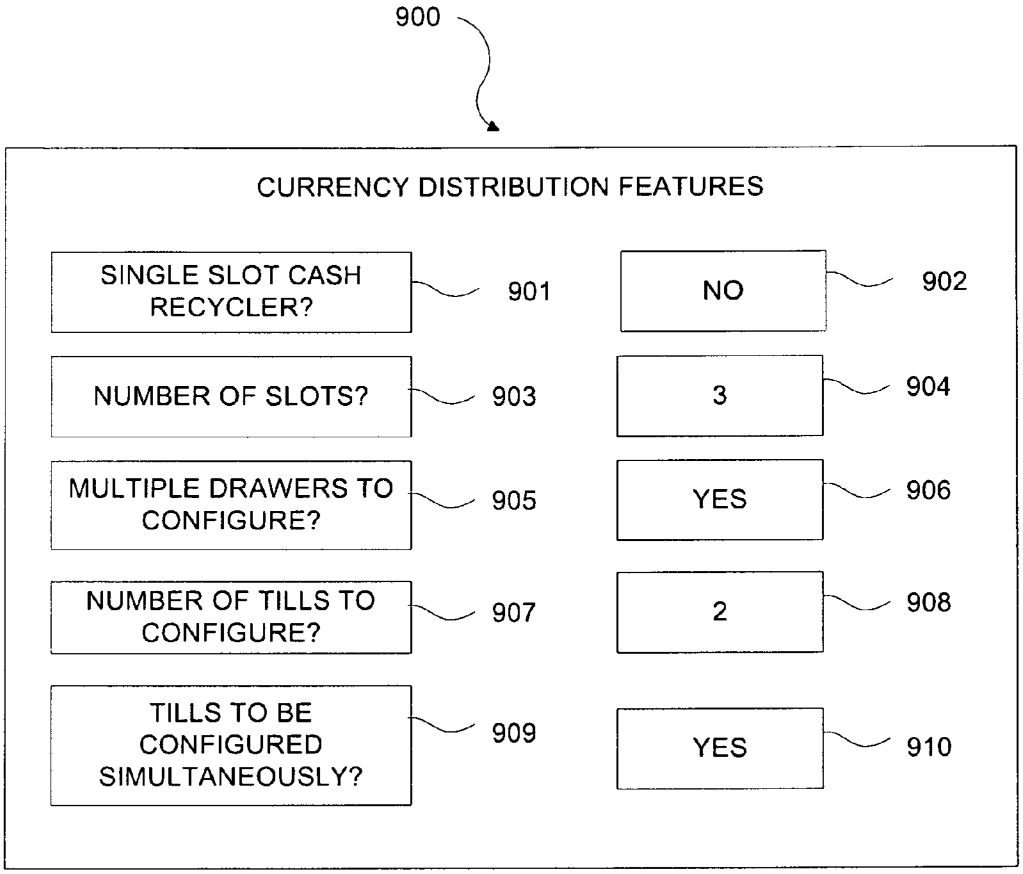
FIG. 9 illustrates an example user interface for configuring various aspects of the cash distribution system according to aspects described herein.

FIG. 9 illustrates an example user interface 900 for configuring one or more features of the currency distribution system described herein. In field 901, a user may configure the type of cash recycler being used. That is, the user may select whether the cash recycler has a single slot or multiple slots. In field 902, the user may indicate that the cash recycler has a single slot with a yes or a no in field 902 would indicate that the cash recycler has multiple slots. In field 903, the user may configure the number of slots for receiving a cash drawer in the cash recycler. In field 904, a user has indicated that the cash recycler has three drawers.

Although the cash recycler may have multiple slots, a user may only configure a single drawer or, in some arrangements, may configure multiple drawers. Field 905 indicates that a user may select to configure a single drawer or multiple drawers, regardless of the number of slots in the cash recycler. Field 906 indicates that the user has multiple drawers to configure. Region 907 permits a user to indicate the number of tills or drawers to configure. Field 908 indicates that a user has three tills or drawers to configure in the arrangement shown in FIG. 9. Region 909 permits a user to configure the tills simultaneously or consecutively, i.e. one after another. In field 910 a user has determined to configure the tills simultaneously. That is, in a cash recycler having multiple slots, the user will insert multiple tills into the cash recycler and all of the tills will be configured simultaneously.

Figure 10:
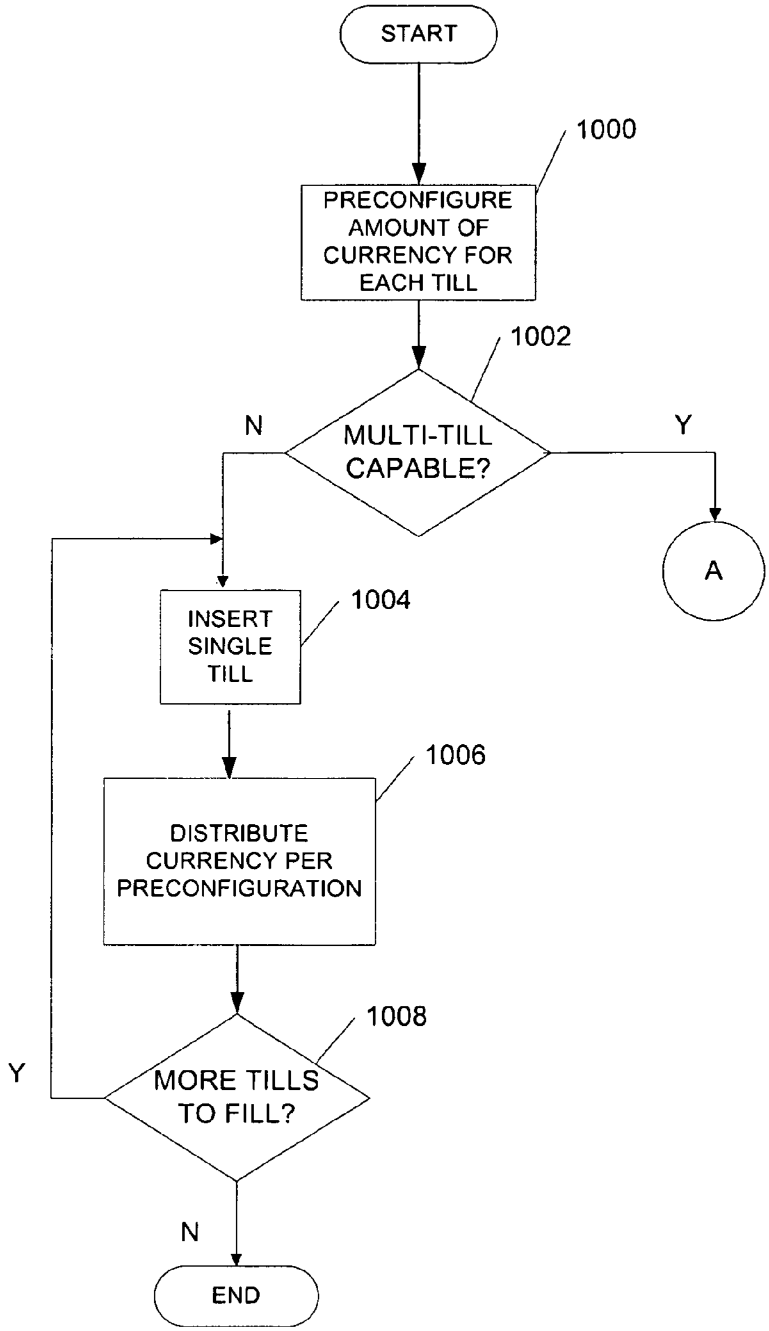
FIG. 10 is an example method of filling a single cash drawer according to aspects described herein.
Figure 11:
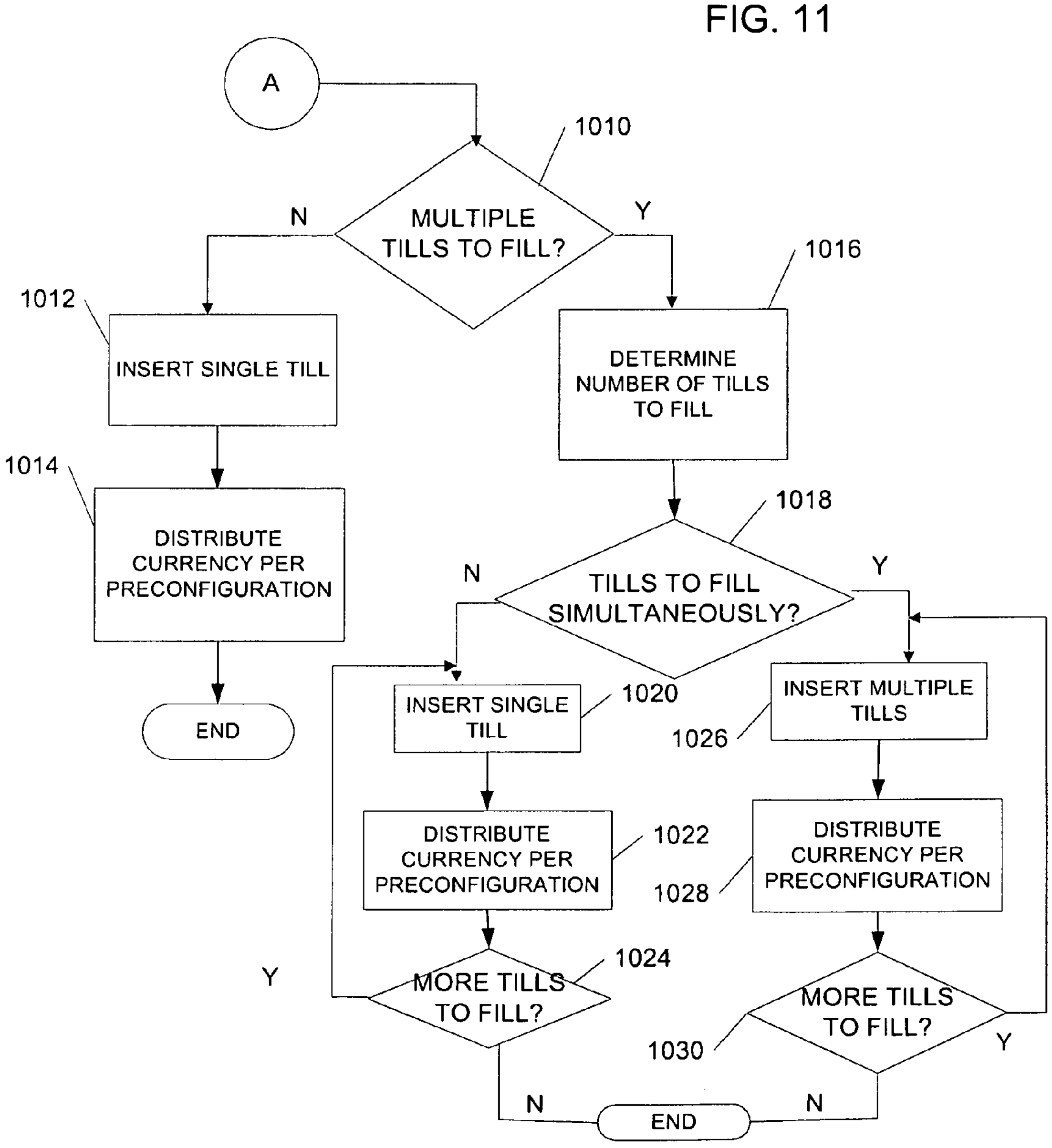
FIG. 11 is an example method of filling multiple cash drawers according to aspects described herein.

FIG. 10 illustrates one example method of distributing a preconfigured amount of currency to a cash drawer or till. In step 1000, a user may preconfigure the amount of currency to distribute to each till. In some arrangements, there may be various types of tills, i.e., front desk tills, drive through tills, and the like. Each type of till may then have one or more preconfigured fills. For instance, if the first shift of the day is generally the busiest, one preconfigured fill for that shift for a certain type of till may include more currency then a third shift fill for that till which may be a less busy shift. This arrangement will be discussed more fully below with respect to FIG. 12. In step 1002, a determination is made as to whether the cash recycler is multi-till capable. That is, a determination is made as to whether the cash recycler includes multiple slots or a single slot. If the cash recycler has a single slot, a single till or cash drawer is inserted into the slot in step 1004. In step 1006, the preconfigured amount of currency is distributed to the till or cash drawer inserted into the cash recycler. In step 1008, a determination is made as to whether currency should be distributed to additional tills. If yes, the first till is removed from the slot and a second till may be inserted into the slot. The currency is then distributed to that till and the process continues until there are no additional tills to fill. In one or more arrangements, each distribution of currency to a cash drawer, i.e., fill, may be considered an individual transaction. As such, a fill may be interrupted for one or more reasons, such as an emergency stop is needed, a mistake has been made, etc. In addition, there may be an indication on the display that a certain fill of a given till is "fill X of Y." For instance, there may be five tills to fill and, as the third cash drawer is being filled, the display may indicate "till 3 of 5" is being filled. An option to cancel the current fill may also be provided. The fill may also end midstream on a timeout indication. That is, if the cash drawers have been filled but remain in the cash recycler for a predetermined amount of time, no additional cash drawers may be filled using the filling process used for the timeout tills. Instead, the fill process would be restarted in order to fill the remaining cash drawers. These arrangements may be used with single slot and multi-slot cash recyclers.

If the cash recycler is multi-till capable, i.e., has multiple slots, a determination is made, at step 1010 as to whether a user has multiple tills to fill. If the user has only a single till or cash drawer to fill, the user will insert the till into one of the plurality of slots in the cash recycler in step 1012. Once the drawer is inserted, the preconfigured amount of currency will be distributed to the till in step 1014. The till may then be removed from the cash recycler and taken to a cash register or other point of sale device.

If the user has multiple tills to fill in step 1010, a user may indicate the number of tills to which currency will be distributed in step 1016. In some arrangement, the cash recycler may determine the number of tills to fill based on the number of tills inserted into the cash recycler at the time. In step 1018, a user may indicate whether the tills are to be filled simultaneously (i.e., several tills are inserted into slots in the cash recycler and all are filled simultaneously) or consecutively (i.e., one drawer is inserted and filled at a time, followed by another drawer, etc.). If the drawers are to fill consecutively, a single till is inserted into the cash recycler at step 1020. The preconfigured amount of currency is distributed to the cash drawer in step 1022. In step 1024, a determination is made as to whether there are additional tills or cash drawers to fill. If so, the first drawer is removed from the cash recycler and a second drawer is inserted, the preconfigured amount of currency is distributed, etc. The process continues until there are no additional tills to fill.

If the tills or cash drawers are to fill simultaneously in step 1018, multiple tills may be inserted into the multiple slots of the cash recycler in step 1026. The preconfigured amount of currency is simultaneously distributed to each of the cash drawers in step 1028. In step 1030, a determination is made as to whether there are additional cash drawers to fill. If so, the first tills are removed from the cash recycler and additional drawers are inserted. The process continues until there is a determination that there are no additional tills or cash drawers to fill. In addition, each till may include a bar code, RFID tag or other unique identifier which will identify the drawer itself and/or the amount of currency of each denomination the drawer received when filled. This arrangement will aid in identifying the drawer at the end of a shift or whenever the drawer is returned to the cash recycler to ensure a proper count of currency is maintained.

FIG. 12 illustrates another user interface 1200 that may be used to configure various aspects of the currency distribution system described herein. In some arrangements, a user may preconfigured the number of each type of till and fill to distribute, i.e., user may input a request to fill x number of cash drawers that may be used in a particular location, point of sale units, etc. For instance, user interface 1200 includes options to preconfigured various types of cash drawers or tills, such as front desk till 1201 that may be used at a front desk or customer service type station, drive-through till 1203 for use in a register or point of sale system at a drive-through window, cashier till 1205 that may be used at one or more cash registers or point of sale systems in a retail store, and specialty counter till 1207 that may be used in a specialty department, such as electronics, automotive, etc.

Fields 1208-1215 are regions configured to receive user input regarding a particular shift for which a certain till will be used. The currency distribution or fill for each shift may be predetermined and will include the number of bills of each denomination to be distributed to each till of that type for that shift. For instance, a front desk till can be configured for first, second or third shift in regions 1208-1210 in order to accommodate changes in business between each shift. Additionally or alternatively, the drive through till 1203 may be configured for a "holiday" shift, as shown in field 1211. Fields 1216-1223 are configured to receive user input regarding a number of tills of each type that will be filled. For instance, field 1220 indicates that 5 cashier tills having a first shift fill will be loaded. The user may input selections for the type of till, number of tills, and type of fill via known user input methods, such as clicking or double clicking in the region and typing the desired entry, selecting from a drop-down menu, selecting a radio button associated with the desired selection, and the like.

Although not required, one of ordinary skill in the art will appreciate that various aspects described herein may be embodied as a method, a data processing system, or as one or more computer-readable media storing computer-executable instructions. Accordingly, those aspects may take the form of an entirely hardware embodiment, an entirely software embodiment or an embodiment combining software and hardware aspects. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the invention have been described in terms of illustrative embodiments thereof Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

Aspects of the present disclosure relate to cash handling devices. Cash handling devices generally refer to devices that are configured to accept and/or dispense currency. Cash handling devices include payment kiosks, point of sale systems such as cash registers, automated teller machines (ATMs), currency recyclers and the like. Currency recyclers generally refer to cash handling devices that are configured to dispense the same currency that was earlier deposited. For example, if a user deposits a 5 dollar bill into a cash recycler machine, the same 5 dollar bill may be dispensed during a subsequent withdrawal transaction. Thus, using currency recyclers, deposited currency may be placed immediately back into use and circulation instead of being held or frozen until a bank is able to collect and reconcile the funds, stored indefinitely and/or taken out of circulation entirely as is the case with other current cash handling devices.

We claim:

1. A cash handling device, comprising:
- a currency storage portion;
- at least one aperture for receiving a cash drawer;
- a sensor for determining that the cash drawer is inserted into the aperture; and
- a cash dispensing mechanism for transferring a preconfigured amount of currency from the currency storage portion to the cash drawer, the preconfigured amount of currency including a preconfigured number of bills of a first denomination and a second denomination different from the first denomination.

2. The cash handling device of claim 1, wherein the preconfigured amount of currency includes a preconfigured number of bills of each of the at least one denomination.

3. The cash handling device of claim 1, wherein the sensor is an optical sensor.

4. The cash handling device of claim 1, wherein the cash dispensing mechanism includes a plurality of conveyor belts.

5. A cash handling device, comprising
- a currency storage portion;
- at least three apertures, each of the at least three apertures configured to simultaneously receive a cash drawer;
- a sensor for determining that the cash drawer is inserted into the aperture; and
- a cash dispensing mechanism for simultaneously transferring a preconfigured amount of currency from the currency storage portion to the cash drawer received in each aperture, the preconfigured amount of currency including a currency note of a first denomination and a currency note of a second denomination, different from the first denomination.

6. The cash handling device of claim 5, wherein at least three cash drawers are inserted into the at least three apertures to receive, simultaneously, the preconfigured amount of currency.

7. A method of distributing currency from a cash recycler to a cash drawer, comprising:
- preconfiguring an amount of currency to transfer from a storage portion of the cash recycler to the cash drawer including preconfiguring a number of bills of a first denomination and a second denomination different from the first denomination, to be transferred;
- receiving the cash drawer in a cash drawer slot of the cash recycler;
- determining, by the cash recycler, that the cash drawer is inserted into the slot of the cash recycler; and
- automatically distributing, by the cash recycler, the preconfigured amount of currency to the cash drawer.

8. The method of claim 7, wherein the step of determining that the cash drawer is inserted into the slot of the cash recycler includes triggering a sensor to indicate that the drawer is inserted.

9. The method of claim 7, wherein the step of inserting the first cash drawer into a slot of the cash recycler includes inserting the first cash drawer into the only cash drawer slot in the cash recycler.

10. A method of distributing currency from a cash recycler to a cash drawer, comprising:
- preconfiguring an amount of currency to transfer from a storage portion of the cash recycler to a first cash drawer, the preconfigured amount of currency including a currency note of a first denomination and a currency note of a second denomination different from the first denomination;
- receiving the first cash drawer into a cash drawer slot of the cash recycler;
- determining, by the cash recycler, that the first cash drawer is inserted into the slot of the cash recycler;
- distributing, by the cash recycler, the preconfigured amount of currency to the first cash drawer; and
- determining whether currency should be distributed to a second cash drawer.

11. The method of claim 10, further including upon determining that currency should be distributed to a second cash drawer, removing the first cash drawer from the cash drawer slot and inserting the second cash drawer into the cash drawer slot in consecutive steps.

12. A method of distributing currency from a cash recycler to a plurality of cash drawers, comprising:
- preconfiguring an amount of currency to be distributed to each cash drawer, the preconfigured amount of currency including a currency note of a first denomination and a currency note of a second denomination different from the first denomination;
- inserting the plurality of cash drawers into a plurality of cash drawer slots in the cash recycler;
- determining that the plurality of cash drawers are inserted into the plurality of cash drawer slots; and
- distributing the preconfigured amount of currency to each of the plurality of cash drawers simultaneously.

13. The method of claim 12, the step of determining that the cash drawer is inserted into the slot of the cash recycler includes triggering a sensor to indicate that the drawer is inserted.

14. The method of claim 12, wherein the step of preconfiguring the amount of currency includes preconfiguring a number of bills of each denomination to be transferred.

15. The method of claim 12, wherein the step of preconfiguring the amount of currency includes preconfiguring a number of bills of each denomination to be transferred.

16. The method of claim 15, further including upon determining that currency should be distributed to a second plurality of cash drawers, removing the plurality of cash drawers from the plurality of cash drawer slots and inserting the second plurality of cash drawers into the plurality of cash drawer slots in consecutive steps.

17. The method of claim 12, wherein the number of cash drawers is equal to the number of cash drawer slots.

18. The method of claim 12, wherein the plurality of cash drawer slots includes at least three cash drawer slots.

19. The method of claim 12, wherein the step of preconfiguring the amount of currency includes receiving user input at a user interface of the cash recycler.

20. The method of claim 19, wherein the user interface is a touch-sensitive display.

* * * * *

UNITED STATES PATENT AND TRADEMARK OFFICE

CERTIFICATE OF CORRECTION

PATENT NO. : 8,201,680 B1
APPLICATION NO. : 12/241201
DATED : June 19, 2012
INVENTOR(S) : Amy Baker Folk et al.

It is certified that error appears in the above-identified patent and that said Letters Patent is hereby corrected as shown below:

In Column 12, Claim 15, Lines 47-49:

Please replace the printed claim with the following:

--The method of claim 12, determining whether currency should be distributed to a second plurality of cash drawers.--

Signed and Sealed this
Fourth Day of September, 2012

David J. Kappos
*Director of the United States Patent and Trademark Office*